（12）United States Patent
Huenemoerder

(10) Patent No.: US 10,900,697 B2
(45) Date of Patent: Jan. 26, 2021

(54) HEAT PUMP DEVICE HAVING DE-ICING FUNCTION

(71) Applicants: DENSO AUTOMOTIVE Deutschland GmbH, Eching (DE); DENSO CORPORATION, Kariya (JP)

(72) Inventor: Werner Huenemoerder, Eching (DE)

(73) Assignees: DENSO AUTOMOTIVE Deutschland GmbH, Eching (DE); DENSO CORPORATION, Kariya (JP)

( * ) Notice: Subject to any disclaimer, the term of this patent is extended or adjusted under 35 U.S.C. 154(b) by 135 days.

(21) Appl. No.: 15/860,743

(22) Filed: Jan. 3, 2018

(65) Prior Publication Data

US 2018/0202697 A1  Jul. 19, 2018

(30) Foreign Application Priority Data

Jan. 13, 2017  (DE) .......................... 10 2017 100 653

(51) Int. Cl.

| | |
|---|---|
| *F25B 47/02* | (2006.01) |
| *B60H 1/32* | (2006.01) |
| *F25B 25/00* | (2006.01) |
| *F25B 1/00* | (2006.01) |
| *B60H 1/00* | (2006.01) |

(Continued)

(52) U.S. Cl.
CPC ....... *F25B 47/025* (2013.01); *B60H 1/00899* (2013.01); *B60H 1/00907* (2013.01); *B60H 1/32284* (2019.05); *F25B 1/005* (2013.01); *F25B 25/005* (2013.01); *B60H 2001/00928* (2013.01); *F25B 9/008* (2013.01); *F25B 2339/047* (2013.01); *F25B 2400/121* (2013.01)

(58) Field of Classification Search
CPC ...... F25B 47/025; F25B 25/005; F25B 1/005; F25B 2400/121; F25B 2339/047; F25B 9/008; B60H 1/00899; B60H 1/00907; B60H 2001/00928
USPC ............................................................ 62/81
See application file for complete search history.

(56) References Cited

U.S. PATENT DOCUMENTS

| | | | |
|---|---|---|---|
| 2013/0299129 A1* | 11/2013 | Osaka ................... | B60H 1/0005 165/59 |
| 2014/0026601 A1* | 1/2014 | Chen ....................... | F28F 9/027 62/81 |

(Continued)

FOREIGN PATENT DOCUMENTS

| | | | |
|---|---|---|---|
| DE | 102012201819 A1 | 8/2013 | |
| EP | 0566854 A2 * | 10/1993 | ............. B60H 1/323 |

(Continued)

OTHER PUBLICATIONS

Uchida, Kazuhide, Temperature Adjustment System for Vehicle, European Patent Office, English Translation (Year: 2012).*

*Primary Examiner* — Steve S Tanenbaum

(57) ABSTRACT

Within a warm circuit, a first heat exchanger is in heat exchanging contact with a heat source. A second heat exchanger is in heat exchanging contact with a space to be heated. Within a cold circuit, a third heat exchanger is in heat exchanging contact with a heat sink. A fourth heat exchanger is in contact with an external region. A valve device is to connect the warm circuit with the cold circuit. An actuating device is to switch the fourth heat exchanger into a de-icing mode. The valve device enables mixing of coolant at least partially from a portion of the warm circuit into the cold circuit.

6 Claims, 1 Drawing Sheet

(51) Int. Cl.
*F25B 9/00* (2006.01)
*F25B 30/02* (2006.01)

(56) References Cited

U.S. PATENT DOCUMENTS

2015/0273976 A1* 10/2015 Enomoto ............. B60L 3/0061
    165/202
2016/0101666 A1* 4/2016 Sugimura .......... B60H 1/00899
    165/202

FOREIGN PATENT DOCUMENTS

| EP | 566854 A2 | 10/1993 | | |
|---|---|---|---|---|
| JP | 2012017056 A | * | 1/2012 | |
| WO | 2014-143621 A1 | | 9/2014 | |
| WO | 2014196138 A1 | | 12/2014 | |
| WO | WO-2014196138 A1 | * | 12/2014 | ............. B60L 50/16 |

* cited by examiner

HEAT PUMP DEVICE HAVING DE-ICING FUNCTION

CROSS REFERENCE TO RELATED APPLICATION

This application is based on German Patent Application No. 10 2017 100 653.2 filed on Jan. 13, 2017, the disclosure of which is incorporated herein by reference.

TECHNICAL FIELD

The present disclosure relates to a heat pump device having de-icing function. The disclosure further relates to a method for alternating between a heat pump mode and a de-icing mode of such a heat pump device.

BACKGROUND

Various types of heat pumps are known from prior art, which are used, for example, as heating systems for buildings and vehicles.

SUMMARY

It is an object of the present disclosure to produce a heat pump device having a de-icing function, a motor vehicle having the heat pump device, and a method for operating a heat pump device.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
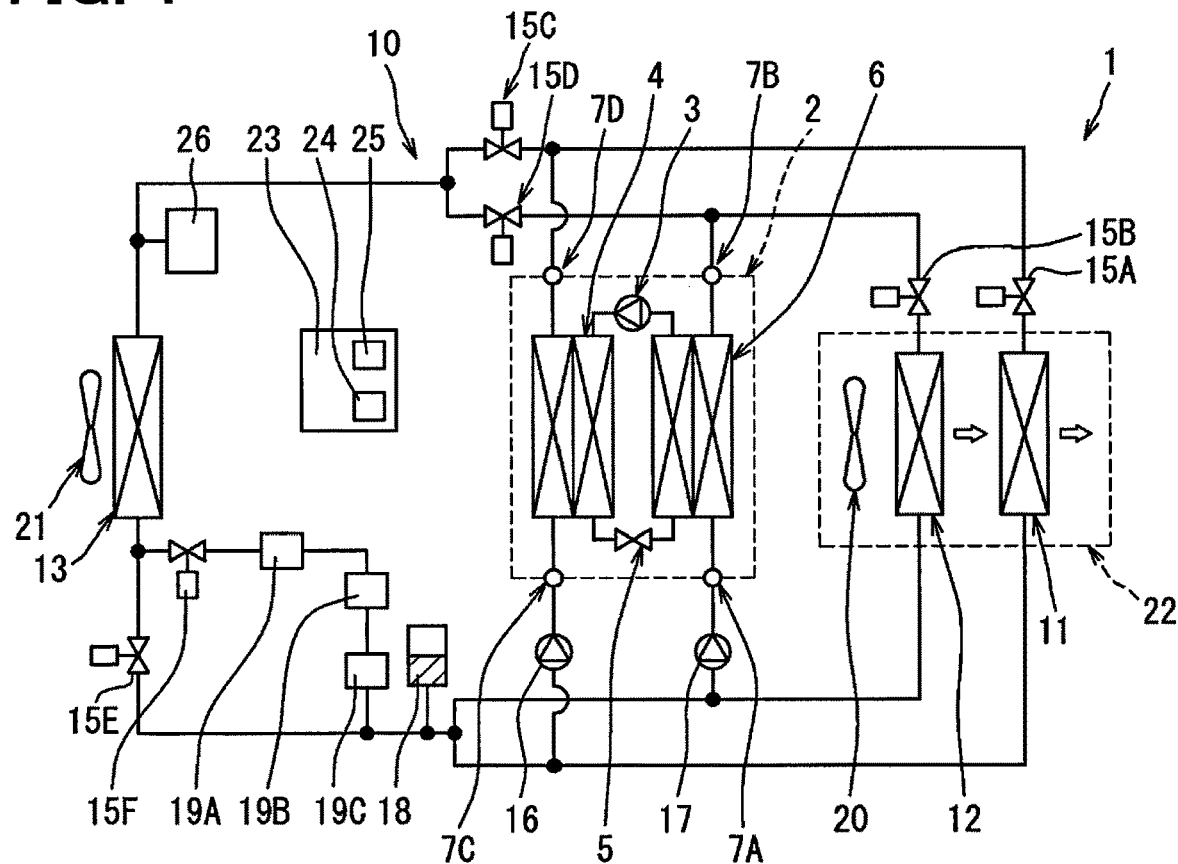
FIG. 1 is a diagram schematically showing a heat pump device according to an exemplary embodiment of the disclosure.

The physical principle of heat pumps is to absorb thermal energy from a lower-temperature reservoir by applying driving energy and to transfer it together with the driving energy to a higher-temperature system which is to be heated. A heat pump thus comprises in its system a heat source which emits thermal energy as useful heat and a heat sink which in turn absorbs energy from the lower-temperature reservoir.

Since a heat pump can also operate in reverse as a cooling system or air conditioning system, such a use is implicitly included, although in the following disclosure it has a subordinate significance at best.

While with direct heat pumps the heat source is in direct contact with the space to be heated (typically using an air heat exchanger), so-called indirect systems having a fluid-based coolant secondary device are also known. In this case, the primary heat pump device is not in direct contact with the environment, but rather is in heat exchanging contact with its heat source via a first heat exchanger having a warm circuit of the coolant secondary device. A second heat exchanger is connectable arranged in this warm circuit, which is then in heat exchanging contact with the space to be heated. Analogously, the heat sink is in heat exchanging contact with a cold circuit of the coolant secondary device via a third heat exchanger. A fourth heat exchanger is connectable arranged in this cold circuit, which is then in heat exchanging contact with the external area as a lower-temperature reservoir. The second and fourth heat exchangers can then be designed in turn as air heat exchangers.

In this context, coolants are understood to be a heat-retentive/heat-storing fluid, for example a liquid, which is not subjected to phase transitions during operation itself. As a coolant, an aqueous solution with depressed freezing point is particularly suited, for example a water-glycol mixture. In principle, however, non-aqueous coolants, e.g. oils, can also be used.

One benefit among others of such systems, often also known as coolant-to-coolant heat pumps or simply water-to-water heat pumps, is that, firstly, the area to be air-conditioned is no longer directly in contact at all with the heat exchanger through which the coolant flows. The primary heat pump device can thus be formed as a unit which is separate and of compact design. Furthermore, waste heat can easily be stored as an additional heat source via the water-based secondary circuit, by which the efficiency of the entire heat pump device is increased. This is advantageous for a motor vehicle air conditioning system, for example for electric vehicles, whereby the waste heat of electrical components, e.g. batteries, converters or inverters, can be used.

In the heat pump mode it is occasionally concerned that the cold circuit of the coolant secondary device cools down to below 0° C. at low external temperatures. It thus regularly occurs that the humidity of the surrounding air condenses on the connectable fourth heat exchanger, freezes and thus generates an ice layer, which can reduce the heat exchange properties of the fourth heat exchanger. Such an ice layer must be periodically removed. Various solutions are known from prior art. However, these are connected to additional effort in terms of apparatus. For example, a coolant-to-coolant heat pump is known from WO2014/143621A1, in which the cold circuit of the coolant secondary device is briefly heated by hot gas of the primary refrigerant circuit being passed through directly to the evaporator by means of a bypass.

The present disclosure relates to a generic heat pump device having de-icing function which is cost-effective, economical in construction and simple to operate.

The following exemplary embodiment refers to a heat pump device 1 for an electric vehicle, without being limited to this. Further applications thus arise for other types of motor vehicle, for example vehicles which are not driven continuously by an internal combustion engine, such as motor vehicles having hybrid drive. Applications outside the automobile industry are further conceivable, especially for buildings and temporary living and work environments, e.g. containers.

Figure 2:
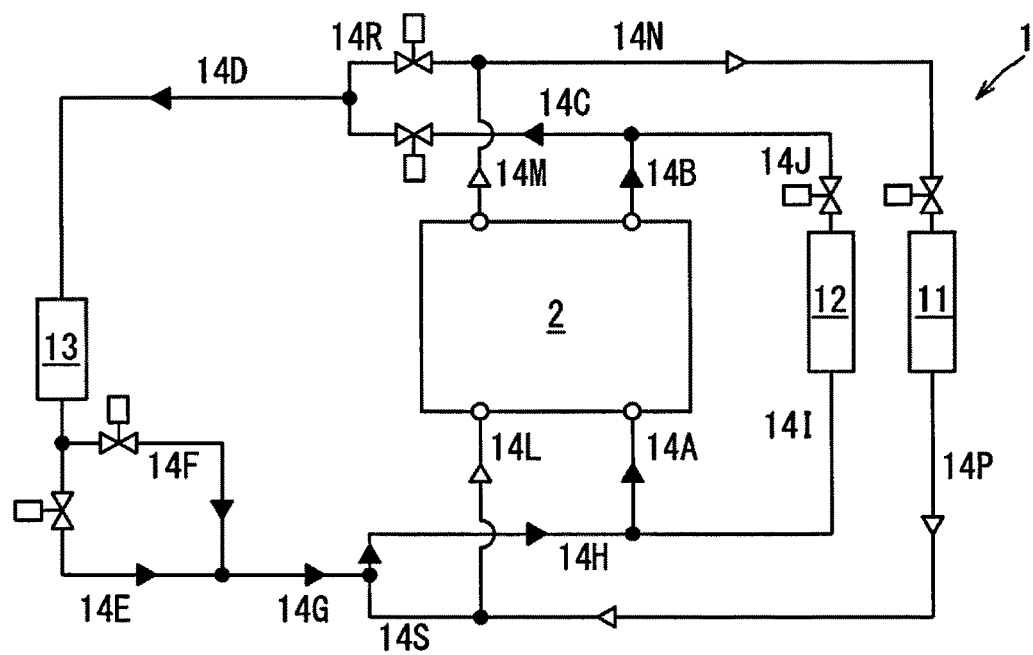
FIG. 2 is a diagram schematically showing the heat pump device from FIG. 1, focusing on the different coolant line portions.

In FIGS. 1 and 2 respectively, the same heat pump device 1 is schematically illustrated according to an exemplary embodiment of the disclosure. While in FIG. 1 the focus is directed to the individual components, the focus in FIG. 2 is on the individual coolant line portions 14A-14S, and the typical flow direction of the coolant. In the following, reference is made to both figures in parallel.

The heat pump device 1 comprises a refrigerant compact unit 2 which has the function of a primary heat pump device. The refrigerant compact unit 2 is in heat exchanging contact with a coolant secondary device 10 via fluid connections. The coolant secondary device 10 has heat exchangers 11, 12, 13, which are integrated into the vehicle air conditioning.

While the hot heat exchanger 11 and the cool heat exchanger 12 are arranged in the HVAC (heating, ventilation and air conditioning) housing, the external heat exchanger 13 is typically installed in the front part of the electric vehicle. The heat pump device 1 further comprises a control device 23 as well as an icing detection device 26.

The refrigerant compact unit 2 is sealed as a closed structural unit and can only be connected to the other parts of the heat pump device 1 via the coolant connectors 7A-7D as well as the electrical connection (not shown). Internally it has a refrigerant circuit having a compressor 3, said compressor being subsequently connected in a circulatory manner, condenser 4, expansion valve 5 and chiller 6. The known functioning of the coolant circuit is not discussed in more detail here. Various components which are suitable for this may be used. This can also be any refrigerant, for example R1234yf or R744, without being limited to these. In the condenser 4, condensed, heated refrigerant is in heat exchanging contact with the cooling fluid of the coolant secondary device 10. This therefore represents the heat source of the system. In the chiller 6, decompressed, cooled refrigerant is in heat exchanging contact with the cooling fluid of the coolant secondary device 10. This therefore represents the heat sink of the system. The coolant secondary device 10 is connected to the refrigerant compact unit 2 via the coolant connectors 7A-7D.

The coolant secondary device 10 is filled with a water-based solution, for example a 50:50 mixture of water and glycol. It has a warm circuit (14L-14S) and a cold circuit (14A-14H). A reservoir 18 is further provided, in order to compensate for fluctuations of the cool liquid, especially when switching between different operating modes.

The cold circuit and the warm circuit are now illustrated by way of example based on the heat pump operation for provision of a heating function. It should be noted that, especially for a cooling mode (or air conditioning), the course of the warm circuit and the cold circuit runs differently, which is, however, incidental to the present disclosure.

The cold circuit is connected to the line portion 14A on the coolant connector 7A (inlet to the heat sink) and to the line portion 14B on the coolant connector 7B (outlet from the heat sink). When passing through the heat sink in the chiller 6, the coolant transfers heat to the refrigerant and thus cools down. The coolant passes the valve 15D via the line portion 14C, said valve being fully open in heat pump mode, to the line portion 14D. From there the coolant reaches the external heat exchanger 13, where the coolant (by absorption of heat) is heated again. The coolant reaches a branching point via the line portions 14E to 14G, from where it reaches the exit point 14A again via the line portion 14H (the coolant does not branch off into the line portion 14S due to the counter-flow of the warm circuit). This coolant flow is driven by the cold circuit pump 17, which is arranged in the line portion 14A. The location of the cold circuit pump 17 can also differ depending on more accurate line routing. Furthermore, several pumps can also be used in the cold circuit.

In the region of the line portion 14B, a part of the coolant can further flow in the direction of line portion 14J and there flow through the cool heat exchanger 12. This is made possible if the valve 15B is at least partially opened. A smaller sub-stream is typically led through the cool heat exchanger 12 in order to be able to itself provide dehumidification in a pure heating mode, as is sufficiently well-known from the usual design of air conditioning systems. This sub-stream then flows back together with the sub-stream from line portion 14I from the line portion 14H into the line portion 14A.

When leaving the external heat exchanger 13, the coolant can be redirected alternatively or partially through the line portion 14F instead of through the line portion 14E. In the line portion 14F, various electrical components are arranged in heat exchanging contact. An electric motor 19A, a converter 19B and an inverter 19C are illustrated by way of example. In normal cases these electrical components supply waste heat when in operation, which can be recovered for a heating function. The valve 15E is fully or at least partially closed and the valve 15F is fully or at least partially open for redirecting the coolant into the line portion 14F.

The warm circuit is connected to the line portion 14L at the coolant connector 7C (inlet to the heat source) and to the line portion 14M at the coolant connector 7D (outlet from the heat source). When flowing through the heat source in the condenser 4, the refrigerant transfers heat to the coolant and thus cools down. The coolant passes the valve 15A via the line portion 14N, said valve being fully open in heat pump mode, to the line portion 14P, in which the coolant cools down in the hot heat exchanger 11 (while releasing heat). The coolant further reaches a branching point before the line portion 14S. This coolant flow is driven by the warm circuit pump 16, which is preferably arranged in the line portion 14L. The location of the warm circuit pump 16 can also be different depending on more exact line routing. Furthermore, several pumps can likewise be used within the warm circuit. It should be further noted that with corresponding sizing of the line portions 14S and 14H, almost no mixing of the fluid takes place at this point.

The control device 23 is of any design and arranged at any point. It is, for example, integrated into the control device of the air conditioning of the electric vehicle and indirectly connected to all the parts of the heat pump device 1 which are to be controlled (not illustrated). These are for example the valves 15A-15F, the pumps 16, 17, the fans 20, 21 as well as the icing detection device 26. The control device 23 is associated with at least a memory unit 24 and a calculation unit 25 and can access these. In the memory unit 24, various characteristic diagrams for possible icing scenarios and/or historical data on icing events can be stored. With the calculation unit 25, further relevant parameters can be calculated from different sensor data of sensors present if necessary, or other information. It can furthermore be calculated or estimated there as to what the hypothetical coolant mixing temperature is at any time, if, when switching into the de-icing mode, the coolant mixes from the warm circuit into the cold circuit. This calculation allows de-icing to begin at an earlier stage when there is a hypothetical mixing temperature below 0° C., or to plan the de-icing operation in advance.

The icing detection device 26 comprises a device for detecting the icing of the external heat exchanger 13. According to an embodiment variant, a pressure sensor is provided. Together with the calculation unit 25, a degree of icing can be concluded from a characteristic drop in air-side pressure on the external heat exchanger 13. Further device for detecting the icing condition are optionally provided, for example one or several temperature sensors or a camera. The detection of an icing condition in the automobile industry is known in and of itself and will not be further detailed here.

It should be mentioned for the sake of completeness that switching into a cooling mode can be achieved by the valves 15A and 15D being closed and the valves 15B and 15C being fully opened, starting from the heat pump operation.

In the following—based once more on heat pump operation—variants of the de-icing mode will now be illustrated in greater detail. As well as the basic measures, some optional additional measures are illustrated, which can be introduced together or also individually depending on the application.

As a basic measure for de-icing the external heat exchanger 13, the valve 15A is fully or at least partially closed and the valve 15C is likewise fully or at least partially open (the valves 15A, 15C are somewhat downstream of the heat source/coolant connector 7D or from the heat sink/coolant connector 7B, but upstream of the second heat exchanger 11 or fourth heat exchanger 13). Due to this measure, the coolant in the warm circuit in the region of the line portion 14M no longer flows exclusively into the line portion 14N. Depending on the degree of opening of the valves 15A, 15C, a sub-stream of the coolant or even all of the coolant now flows from the warm circuit into the line portion 14R, which was deactivated until then, from where it mixes into the coolant stream of the cold circuit in the line portion 14D.

The heating function via the hot heat exchanger 11 is thus stopped or at least reduced for the duration of the de-icing operation. If additional heating such as, for example, PTC elements, are provided in the electric vehicle, these can be temporarily switched on in addition, if necessary.

Tests have shown that, in typical configurations and under usual conditions, i.e. external temperatures around 0° C. and the surrounding air having relatively high moisture, the coolant arriving into the line portion 14D on the external heat exchanger 13 already has a temperature of <<0° C. after a few seconds, typically of 5-10° C. The de-icing can thus begin almost immediately. It is estimated that in such cases the de-icing typically takes less than 10 seconds, and at most two minutes.

In order to further accelerate the de-icing somewhat, it is further suggested that the flow rate of the coolant into line portions 14A, 14B and/or 14L, 14M is fully or partially reduced in the de-icing mode. This is achieved by reducing by the pump speed of the cold water pump 17 and/or the warm water pump 16. A higher temperature difference thus builds up between the heat source and the heat sink, wherein the average value rises slightly.

A further additional measure comprises in releasing the line portion 14F (if this has not already occurred) in the de-icing mode in order to recover the waste heat of the electrical components 19A-19C.

A further additional measure comprises in reducing the fan speed of the fan 21 allocated to the external heat exchanger 13 when switching into the de-icing mode, or switching it off fully. Depending on whether a heat mode should be further maintained, the fan 20 allocated to the external heat exchanger 11 can be restricted or fully switched off if necessary.

Shortly before the end of the de-icing mode, it is advisable, if the fan 21 attached to the external heat exchanger 13 has been switched off, to switch it on again or to increase the fan speed again. The residual melt-water from the de-icing mode is thus removed from the surface of the external heat exchanger 13 and poses no risk of re-freezing.

Summarizing the above description, the heat pump device according to the disclosure includes a valve device, by which the warm circuit and the cold circuit can be connected to each other. The heat pump device according to the disclosure further includes an actuating device, for example a control device, by which, depending on the icing condition of the fourth heat exchanger, there can be switching into a de-icing mode. The valve device thus at least partially enables the mixing of coolant from each portion of the warm circuit, with which the heat source is in heat exchanging contact, into the cold circuit. In other words, the actuating device is adapted to switch the valve device in such a way that warm and cold coolant mix temporarily and can circulate in the cold circuit. Such a valve device in the fluid-based coolant secondary device is more economical in terms of apparatus. If the heat pump device is also provided for a cooling mode, the valves which were already provided can be used here if necessary. In this case, simply an adjustment of the actuating device or the control device for the de-icing mode is required.

The valve device can include one valve or several valves. Here, the degree of opening for mixing warm coolant into the cold circuit does not have to be fixedly predetermined. Various degrees of opening can be provided depending on the situation. For example, a full opening allows an especially fast and complete mixing and thus also faster de-icing. A partial opening allows the warm circuit to further operate—but with reduced performance—for heating purposes. The line portion in which the mixing is carried out is typically located immediately downstream of the heat source and the heat sink and upstream of the second and fourth heat exchangers.

By mixing coolant from the warm circuit and the cold circuit, a mixture with a sufficiently high temperature >>0° C. is generally achieved immediately, so that the de-icing of the fourth heat exchanger can begin directly afterwards. In the scenario that the mixing temperature is initially still <0° C., the coolant secondary circuit is slowly heated by the driving power supplied. If the primary heat pump circuit is supplied by a coolant circuit, the thermal power supplied ultimately corresponds to the compressor capacity.

Switching into the de-icing mode is typically initiated automatically by the control device. This can be carried out, for example, by using a timer, a condition or due to any trigger. Alternatively, switching into the de-icing mode can also take place manually. For example, advice for switching into the de-icing mode is printed on the side of the control device. The de-icing mode can be manually triggered by an actuating device which is connected to the control device, for example an operating device.

The primary heat pump device can be designed according to various known type. For example, it can be a compression, sorption or magnetic heat pump system. In vehicle construction, at least according to the prior art known to date, a compression heat pump having a coolant primary circuit is to be seen as an embodiment due to its structural properties and due to its power density. In this case, the primary heat pump device has a compressor and an expander element. The heat source is formed by a high-pressure portion passed through the first heat exchanger, which is formed downstream of the compressor and upstream of the expander element. The heat sink is formed by a low-pressure portion passed through the third heat exchanger, which is formed downstream of the expansion organ and upstream of the compressor.

According to an embodiment of the disclosure, the actuating device or the control device is coupled with pumps in the warm circuit and/or in the cold circuit and is adapted in such a way that, in the de-icing mode, the flow rate of the coolant in those portions of the warm circuit and/or the cold circuit with which the heat source and/or correspondingly the heat sink are in heat exchanging contact is at least temporarily reducible. The heat transfer to the heat source and heat sink is thus reduced. In this configuration, for example when a primary refrigerant circuit is used, higher pressure differences between the high-pressure and low-pressure portions thus appear. This effects an adjustment upwards of the compressor capacity, whose additional thermal power then promotes even faster defrosting.

The cold circuit can be brought into heat exchanging contact with electrical components upstream of the third heat exchanger. In the heat pump mode this contact then takes place downstream of the fourth heat exchanger. The control device is then adapted in such a way that the cold circuit can be brought into heat exchanging contact with the electrical components in the de-icing mode. As a result, an additional amount of heat can be supplied to the cold circuit if necessary, which supports a faster and more energetically favourable de-icing.

According to an embodiment of the disclosure, the heat pump device comprises a detection device for detecting an icing condition of the fourth heat exchanger. Such a detection device optionally comprises a temperature sensor, a dynamic pressure sensor, a camera, a calculation unit and/or a memory unit of historically collected measured values. Measured values from a sensor network, e.g. a temperature difference in the area of the fourth heat exchanger, for example, can also be taken into account by means of the detection device, from which conclusions regarding the degree of icing can be drawn. For example, sensors which are optionally already present can be used, so that no additional costs arise. The advantage of direct surveillance of the icing condition is, firstly, that incipient ice formation can be reacted to more precisely. Furthermore, by recording earlier ice events, an incipient ice formation can optionally be predictable very early and the counter-measures can be scheduled.

Furthermore, a device of estimating the hypothetical coolant mixing temperature can be provided in the coolant secondary device. The hypothetical coolant mixing temperature is the temperature which is to be expected at the time of the still separated warm circuit and cold circuit if the coolant from the warm circuit mixes into the cold circuit when switching into the de-icing mode. The control device is then adapted in such a way that the hypothetical coolant mixing temperature is taken into account at the time of switching into the de-icing mode. For example, it will switch into the de-icing mode when there is still low icing if the hypothetical coolant temperature is <0° C., because a delayed de-icing is then to be expected. The estimation of the hypothetical coolant mixing temperature is thus a preventative measure.

According to a development of the heat pump device according to the disclosure, it is provided that a fan for passing air through the respective heat exchanger is allocated to the second heat exchanger and the fourth heat exchanger, and that the control device is adapted in such a way that, when switching into the de-icing mode or during the de-icing mode, the fan speed of at least one of the fans is reduced. For example, the fan allocated to the second heat exchanger can be operated with a lower fan speed in order to spread the distribution of the residual heat out over the duration of the de-icing. The initial de-icing can also be accelerated if necessary by switching off the fan attached to the fourth heat exchanger. Furthermore, if the heating function can be dispensed with for the period of the de-icing and the fan can be completely switched off, energy can thereby be saved if necessary.

It can furthermore be provided that the fan speed of the fan allocated to the fourth heat exchanger is increased again before the end of the de-icing mode. The melt water which is formed by the de-icing is thus blown away by the fourth heat exchanger. Immediate re-freezing is thus reduced.

A motor vehicle, especially an electric vehicle, is advantageously equipped with an aforementioned heat pump device, wherein the fourth heat exchanger is arranged as an external heat exchanger.

A method according to the disclosure for operating an aforementioned heat pump device in which the heat pump device is operated in a heat pump mode and switching into a de-icing mode depending on the icing condition of the fourth heat exchanger is provided, wherein the warm circuit is connected to the cold circuit by mixing of coolant from the portion of the warm circuit with which the heat source is in heat exchanging contact into the cold circuit being at least partially permitted.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A heat pump device comprising: a primary heat pump device having a heat source and a heat sink; a fluid-based coolant secondary device having at least a warm circuit and a cold circuit; a first heat exchanger that is in heat exchanging contact with the heat source of the primary heat pump device; a second heat exchanger that is in heat exchanging contact with a space to be heated and is connectively arranged within the warm circuit; a third heat exchanger that is in heat exchanging contact with the heat sink of the primary heat pump device; a fourth heat exchanger that is in heat exchanging contact with an external area and is connectively arranged within the cold circuit; a valve adapted to connect the warm circuit with the cold circuit to each other; a line portion in which the coolant in the warm circuit and the coolant in the cold circuit are mixed, the line portion located upstream of the fourth heat exchanger; a fan configured to cause air to pass through the fourth heat exchanger; and a controller adapted to switch into a de-icing mode depending on an icing condition of the fourth heat exchanger, wherein the valve enables the coolant from a section of the warm circuit, with which the heat source is in heat exchanging contact, to mix at least partially into the cold circuit, the controller is adapted to reduce a fan speed of the fan when switching to or in the de-icing mode, in the de-icing mode, the controller increases the fan speed of the fan before an end of the de-icing mode to remove water on a surface of the fourth heat exchanger, a part of the cold circuit is: located downstream of the fourth heat exchanger and upstream of the third heat exchanger; and branched at a branch portion into a first passage in which electrical components are provided and a second passage that bypasses the electrical components, the first passage and the second passage rejoining together at a junction portion of the part of the cold circuit, and the controller is configured to cause the coolant to flow through the first passage in the de-icing mode so that the fourth heat exchanger is directly heated by the coolant that has been heated by the electrical components in the first passage.

2. The heat pump device according to claim 1, wherein the controller is coupled with a pump in the warm circuit and/or in the cold circuit and is adapted to at least intermittently reduce a flow rate of the coolant in a section of the warm circuit and/or the cold circuit, with which the heat source and/or correspondingly the heat sink are in heat exchanging contact, in the de-icing mode.

3. The heat pump device according to claim 1, wherein the controller is configured to:
   estimate a hypothetical coolant mixing temperature, which is to be expected when switching into the de-icing mode and when the coolant from the warm circuit mixes into the cold circuit at the time when the warm circuit and the cold circuit are still separated; and
   take into account the hypothetical coolant mixing temperature at the time of switching into the de-icing mode.

4. A motor vehicle having a heat pump device according to claim 1, wherein the fourth heat exchanger is arranged as an external heat exchanger.

5. The heat pump device according to claim 1, further comprising:
   a detection device to detect an icing condition of the fourth heat exchanger.

6. The heat pump device according to claim 5, wherein the detection device to detect an icing condition includes at least one of a temperature sensor, a dynamic pressure sensor, a camera, a calculation unit, or a memory unit of historically collected measured values.

* * * * *